J. C. Tobias,
Cotton Planter,
N° 68,262. Patented Aug. 27, 1867.

Witnesses:
Theo. Tusche
Wm Trewin

Inventor:
J. C. Tobias
Per Munn & Co
Attys.

United States Patent Office.

J. C. TOBIAS, OF HELENA, ARKANSAS.

Letters Patent No. 68,262, dated August 27, 1867.

---

IMPROVEMENT IN COTTON-SEED PLANTERS.

---

The Schedule referred to in these Letters Patent and making part of the same.

---

TO ALL WHOM IT MAY CONCERN:

Be it known that I, J. C. TOBIAS, of Helena, in the county of Philips, and State of Arkansas, have invented a new and improved Cotton-Seed Planter; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved device for planting cotton-seed; and it consists of a revolving toothed wheel and a revolving toothed shaft, placed within a suitable hopper, and used in connection with an adjustable slide at the bottom of the hopper, the latter being mounted on wheels, and connected with a harrow, furrow-opener, and a coverer, all arranged in such a manner as to insure the proper planting of the seed, and the covering thereof with earth. In the accompanying sheet of drawings—

Figure 1:
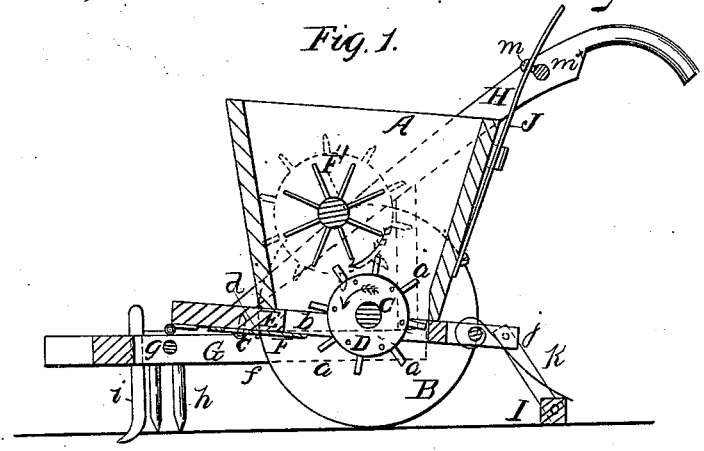
Figure 2:
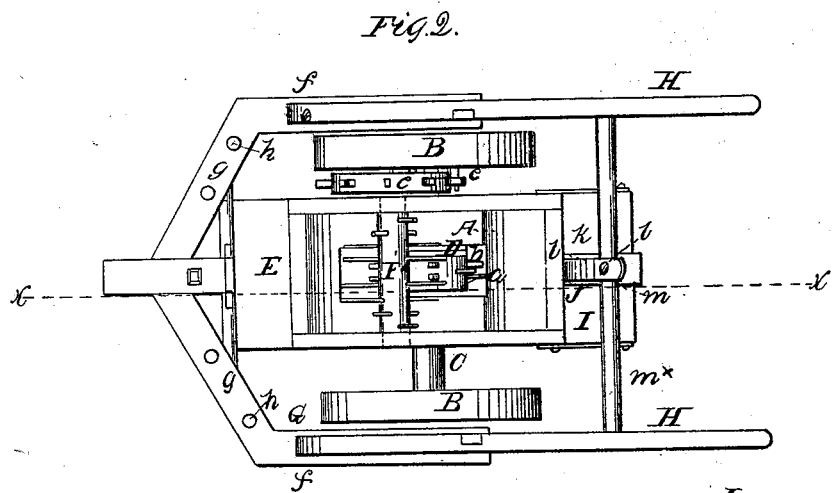

Figure 1 is a side sectional view of my invention, taken in the line $x\ x$, fig. 2.

Figure 2, a plan or top view of the same.

Similar letters of reference indicate like parts.

A represents a hopper, which is mounted on two wheels B B, the axle C of which passes through the lower part of the hopper, the wheels being secured to the axle, so that the latter will turn with the former. On the axle C there is keyed, or otherwise secured, a wheel, D, into the periphery of which there are fitted, at equal distances apart, teeth $a$. These teeth may be screwed into the wheel, so as to admit of being readily lengthened or shortened, as desired, by screwing them in or out. The hopper A is attached to a base-plate, E, the front end of which is hinged to the harrow, hereinafter described, having an opening, $b$, in it to receive the wheel D; and to the under side of this base-plate, directly in front of the wheel, there is attached, by a screw, $c$, an elastic plate, F, the screw passing through a slot, $d$, in the plate to admit of the latter being adjusted nearer to or further from wheel D, as will be fully understood by referring to fig. 1. In the hopper above the wheel D there is a rotary toothed shaft, F', which receives its motion from one of the wheels B, through the medium of gears $e$ at one side of the hopper. The shaft F' rotates in a reverse direction to the wheel D, as indicated by the arrows in fig. 1. G is a harrow-frame, composed of two parallel side pieces $ff$, and two oblique front pieces $g\ g$, which meet in a point, and form a V-shaped front, as shown in fig. 2. This harrow is provided with teeth $h$ of usual construction, and at its front end is provided with a furrow-opener, $i$. A handle, H, is attached to each side piece $f$; and to the rear end of the base-plate E of the hopper there is attached by pivots $j$ a bar, I, against which an adjustable spring, $k$, bears to press the bar upon the ground. The hopper has a spring-plate, J, attached to its back end, with notches $l$ in it to catch upon a pin, $m$, in a cross-rod, $m^\times$, of the handles, and retain the hopper or hold it down, and form a rigid connection between the harrow and the hopper.

As the machine is drawn along the cotton-seed, owing to the fibre upon it, wraps around the toothed shaft F', and the teeth of wheel D take the seed therefrom, and discharge it from the bottom of the hopper, the elastic plate F, by its adjustment, regulating the discharge, so that a greater or less quantity of seed may be planted in a given length of drill, as may be desired. The seed falls into a furrow made by the furrow-opener $i$, and the pressure-bar I covers the seed.

Having thus described my invention, I claim as new, and desire to secure by Letters Patent—

The revolving toothed wheel D, and revolving toothed shaft F', placed within the hopper A, in combination with the adjustable elastic plate F underneath the base-plate of the hopper, substantially as and for the purpose set forth.

I further claim the beam G, in combination with the hopper A, mounted on wheels B B, and connected together, substantially as and for the purpose specified.

I also claim the pressure or covering-bar I, in combination with the harrow G and the hopper A, provided with the seed-distributing device, all constructed and arranged to operate in the manner substantially as and for the purpose set forth.

J. C. TOBIAS.

Witnesses:
 GEO. N. CASH,
 A. E. CHESTER.